(12) United States Patent
Novlan et al.

(10) Patent No.: US 11,490,435 B2
(45) Date of Patent: Nov. 1, 2022

(54) FACILITATING SIDELINK-BASED RELAYING AND MULTI-CONNECTIVITY IN ADVANCED NETWORKS

(71) Applicant: AT&T Intellectual Property I, L.P., Atlanta, GA (US)

(72) Inventors: Thomas Novlan, Cedar Park, TX (US); Xiaoyi Wang, Austin, TX (US); Arunabha Ghosh, Austin, TX (US); Milap Majmundar, Austin, TX (US); Salam Akoum, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 151 days.

(21) Appl. No.: 17/005,822

(22) Filed: Aug. 28, 2020

(65) Prior Publication Data
US 2022/0070951 A1     Mar. 3, 2022

(51) Int. Cl.
| | |
|---|---|
| *H04W 76/15* | (2018.01) |
| *H04W 76/14* | (2018.01) |
| *H04W 28/08* | (2009.01) |
| *H04W 80/02* | (2009.01) |
| *H04W 24/10* | (2009.01) |
| *H04W 92/18* | (2009.01) |

(52) U.S. Cl.
CPC ........... *H04W 76/15* (2018.02); *H04W 24/10* (2013.01); *H04W 28/0875* (2020.05); *H04W 76/14* (2018.02); *H04W 80/02* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 10,306,568 B2* | 5/2019 | Kim | H04W 52/383 |
| 10,602,568 B2* | 3/2020 | Jung | H04W 88/02 |
| 2017/0367007 A1* | 12/2017 | Sirotkin | H04W 28/06 |
| 2018/0324642 A1* | 11/2018 | Yu | H04W 28/065 |
| 2019/0215729 A1* | 7/2019 | Oyman | H04L 5/0082 |
| 2019/0223066 A1* | 7/2019 | Xu | H04W 36/0058 |
| 2019/0281644 A1* | 9/2019 | Hu | H04W 72/0406 |

(Continued)

*Primary Examiner* — Edan Orgad
*Assistant Examiner* — Emmanuel K Maglo
(74) *Attorney, Agent, or Firm* — Amin, Turocy & Watson, LLP

(57) ABSTRACT

Facilitating sidelink-based relaying and multi-connectivity in advanced networks (e.g., 5G, 6G, and beyond) is provided herein. Operations of a method can comprise facilitating, by a first communications device comprising a memory and a processor, an establishment of multiple-connectivity for communication links between a second communications device and a third communications device. Facilitating the establishment of the multiple-connectivity for the communication links can comprise facilitating establishing a communication link between the second communications device and the third communications device. Facilitating the establishment of the multiple-connectivity for the communication links also can comprise facilitating establishing a first communication relay link between the second communications device and the first communications device and a second communication relay link between the first communications device and the third communications device.

20 Claims, 10 Drawing Sheets

(56) References Cited

U.S. PATENT DOCUMENTS

| | | | |
|---|---|---|---|
| 2019/0364554 A1* | 11/2019 | Kuang | H04W 72/0453 |
| 2020/0229249 A1* | 7/2020 | Cheng | H04W 48/16 |
| 2020/0245226 A1* | 7/2020 | Kuang | H04W 48/08 |
| 2021/0044956 A1* | 2/2021 | Kim | H04W 76/27 |

* cited by examiner

FACILITATING SIDELINK-BASED RELAYING AND MULTI-CONNECTIVITY IN ADVANCED NETWORKS

TECHNICAL FIELD

This disclosure relates generally to the field of mobile communications and, more specifically, to performing multi-hop relaying in a Fifth Generation (5G) or other advanced network such that network traffic can be aggregated and sent on one or multiple cellular links and/or direct communication links.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
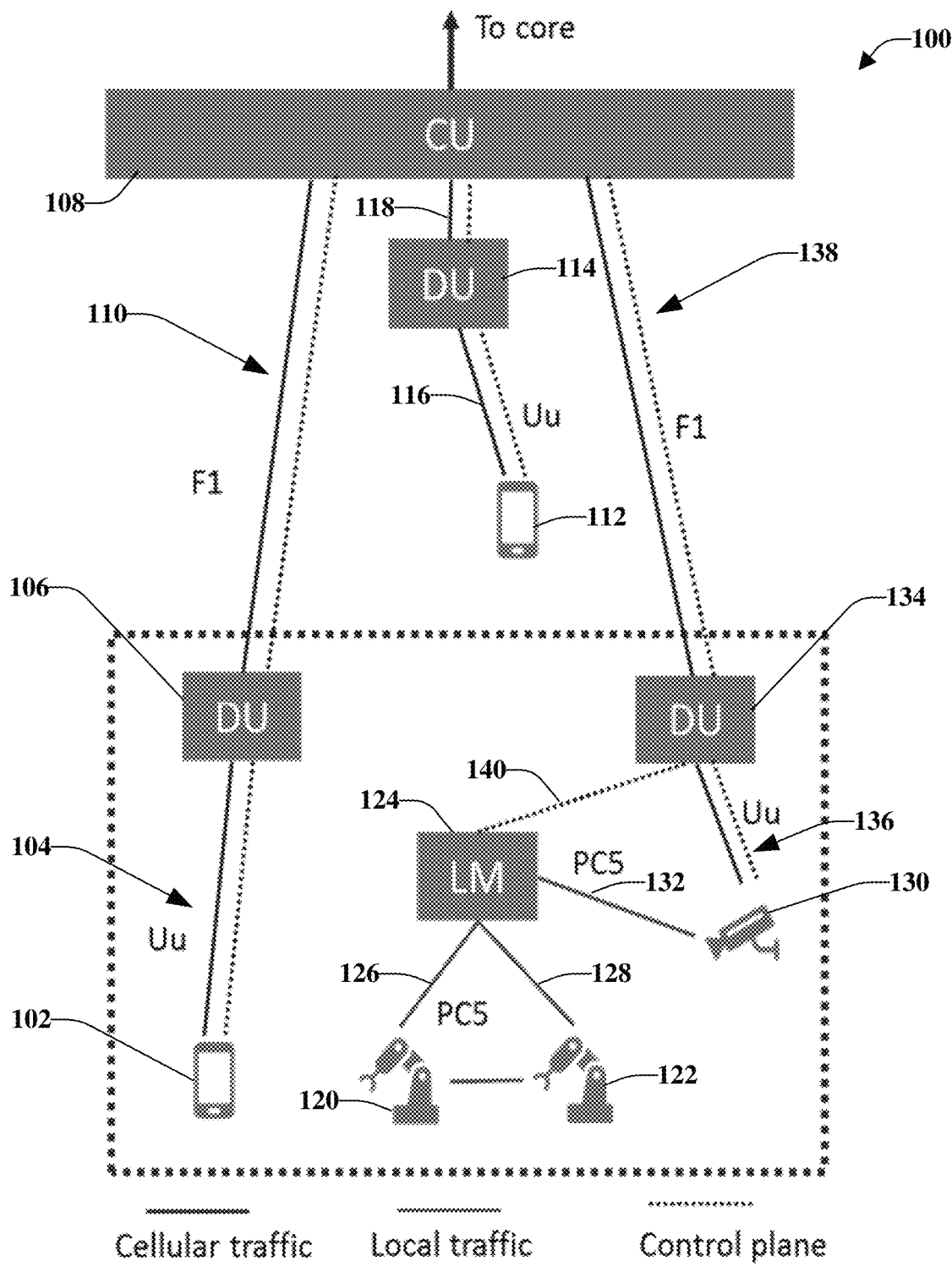
FIG. 1 illustrates an example, non-limiting, representation of a deployment of a communication architecture for advanced communication networks.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate enabling enhanced sidelink services. For example, the various aspects can enable enhanced sidelink services in 5G New Radio (NR) networks or other advanced networks. Multi-hop relaying can be performed utilizing a multiple-connectivity framework such that user traffic (also referred to herein as network traffic) can be aggregated and sent on one or multiple cellular or direct communication links.

According to an embodiment provided is a system comprising a processor and a memory that stores executable instructions that, when executed by the processor, facilitate performance of operations. The operations can comprise facilitating a first communication routing between a first device and a second device via a sidelink connection. The operations also can comprise facilitating a second communication routing between the first device and the second device via a relay connection. The first communication routing and the second communication routing can enable dual connectivity between the first device and the second device.

According to an implementation, facilitating the second communication routing can comprise implementing a relay functionality to relay wireless communication between the first device and the second device. Additionally, implementing the relay functionality can comprise implementing a layer 2 functionality.

In some implementations, facilitating the first communication routing can comprise implementing a direct link between the first device and the second device. The direct link can be implemented via a sidelink interface.

Facilitating the first communication routing and facilitating the second communication routing can comprise facilitating establishing the dual connectivity for the first device and the second device. In an example, the first device can be a transmitter device and the second device can be a receiver device. However, the disclosed aspects are not limited to this implementation and, the first device can be a receiver device and the second device can be a transmitter device.

In an example, the relay connection can be implemented via a cellular interface. Alternatively, or additionally, the relay connection can be implemented via a sidelink interface.

In some implementations, the operations can comprise aggregating the first communication routing and the second communication routing between the first device and the second device based on a first packet data convergence protocol layer of the first device and a second packet data convergence protocol layer of the second device. Further to these implementations, the operations can comprise managing wireless traffic divided across the sidelink connection and the relay connection based on reusing, for the relay connection, a link measurement procedure and a link management procedure determined for the sidelink connection, or vice versa.

According to another embodiment, provided is a method that can comprise facilitating, by a first communications device comprising a memory and a processor, an establishment of multiple-connectivity for communication links between a second communications device and a third communications device. Facilitating the establishment of the multiple-connectivity for the communication links can comprise facilitating establishing a communication link between the second communications device and the third communications device. Facilitating the establishment of the multiple-connectivity for the communication links also can comprise facilitating establishing a first communication relay link between the second communications device and the first communications device and a second communication relay link between the first communications device and the third communications device.

In an example, establishing the communication link can comprise establishing a direct link between the second communications device and the third communications device. Further to this example, establishing the direct link can comprise establishing the direct link via a sidelink interface.

According to another example, establishing the first communication relay link and establishing the second communication relay link can comprise establishing the first communication relay link and the second communication relay link via a cellular interface. Alternatively, or additionally, establishing the first communication relay link and establishing the second communication relay link can comprise establishing the first communication relay link and the second communication relay link via a sidelink interface.

Facilitating the establishment of the multiple-connectivity for the communication links can comprise implementing a layer 2 relay functionality, according to an example.

According to another embodiment, provided is a machine readable storage medium, comprising executable instructions that, when executed by a processor, facilitate performance of operations. The operations can comprise establishing a direct link for first user traffic routed between a first device and a second device via a sidelink interface. The operations also can comprise establishing a relay link for second user traffic routed between the first device and the second device via a cellular interface or the sidelink interface. Establishing the relay link can comprise implementing a layer 2 relay functionality, according to some implementations.

The operations also can comprise routing the first user traffic via the direct link. Further, the operations can comprise routing the second user traffic via the relay link at a same time as the routing the first user traffic via the direct link.

In accordance with some implementations, the operations can comprise aggregating the direct link and the relay link based on a first packet data convergence protocol layer of the first device and a second packet data convergence protocol layer of the second device. Further to these implementations, the operations can comprise managing user traffic divided across the direct link and the relay link based on reusing a link measurement procedure and a link management procedure for the direct link and the relay link.

FIG. 1 illustrates an example, non-limiting, representation of a deployment of a communication architecture 100 for advanced communication networks. The communication architecture 100 comprises communication between User Equipment (UE) devices and network devices (e.g., gNBs) that are over a cellular (Uu) interface or a sidelink (e.g., D2D or PC5) interface.

For example, the deployment of the communication architecture 100 can be for cellular traffic and/or local traffic. As illustrate a first UE device 102 can communicate, via a first cellular interface 104, to a first distributed unit (e.g., first DU 106). The first cellular interface 104 can be Uu interface. The first DU 106 can communicate to a Centralized Unit (CU 108) via a first network interface 110, which can be an F1 (or F1-U) interface (e.g., per 3GPP specifications). The CU 108 can connect directly to a core network, as indicated by the arrow.

Further, a second UE device 112 can communicate with a second DU 114 via a second cellular interface 116, which can be a Uu interface. The second DU 114 can communicate with the CU 108 via a second network interface 118, which can be an F1 (or F1-U) interface. Further, other devices, illustrated as first device 120 and second device 122 can communicate with a Local Manager (LM 124) via respective sidelink interfaces 126 and 128. A third device 130 can communicate with the LM 124 via another sidelink interface 132 and can also communicate with a third DU 134 via a sidelink 136, which can be a Uu interface. The sidelink interfaces 126, 128, 132 represent local traffic. The third DU 134 can communicate with the CU 108 via a third network interface 138, which can be an F1 (or F1-U) interface.

It is noted that the first cellular interface 104, the first network interface 110, the second cellular interface 116, the second network interface 118, the sidelink 136, and the third network interface 138 can comprise both cellular traffic and control plane traffic, as represented by the solid lines and the dashed lines, respectively. A communication 140 between the LM 124 and the third DU 134 can be via the control plane.

The use of dual or multi-connectivity (e.g., two or more simultaneous communication links) can be beneficial for the operation of NR sidelink services where mobility and communication robustness requirements can be the most stringent. An example of a network deployment with multi-connectivity is shown in FIG. 2, which illustrates an example, non-limiting, deployment of a communication network 200 with cellular (Uu) and sidelink multi-connectivity.

The communication network 200 can comprise a network device 202 that can include, or can be associated with a macro/Integrated Access and Backhaul (IAB) donor 204. The network device 202 and/or macro/IAB donor 204 has an area of coverage 206, denoted by the dashed circle. The area of coverage 206 can be, for example, LTE/NR cellular: FR1 coverage. Various devices can be in communication with one another and/or the network device 202 and/or the macro/IAB donor 204. Such devices include, but are not limited to one or more vehicles, illustrated as a first vehicle 208, a second vehicle 210, and a third vehicle 212. The vehicles can communicate with one another via direct communication (e.g., a (V2V) vehicle to vehicle direct communication 214). In another example, the vehicles can communicate with one another via a NR sidelink 216, such as FR1/FR2 interface. Further, various data signaling 218 and backhaul communications 220 can be performed, as well as NR cellular FR2 220, and control plane signaling 224.

Figure 2:
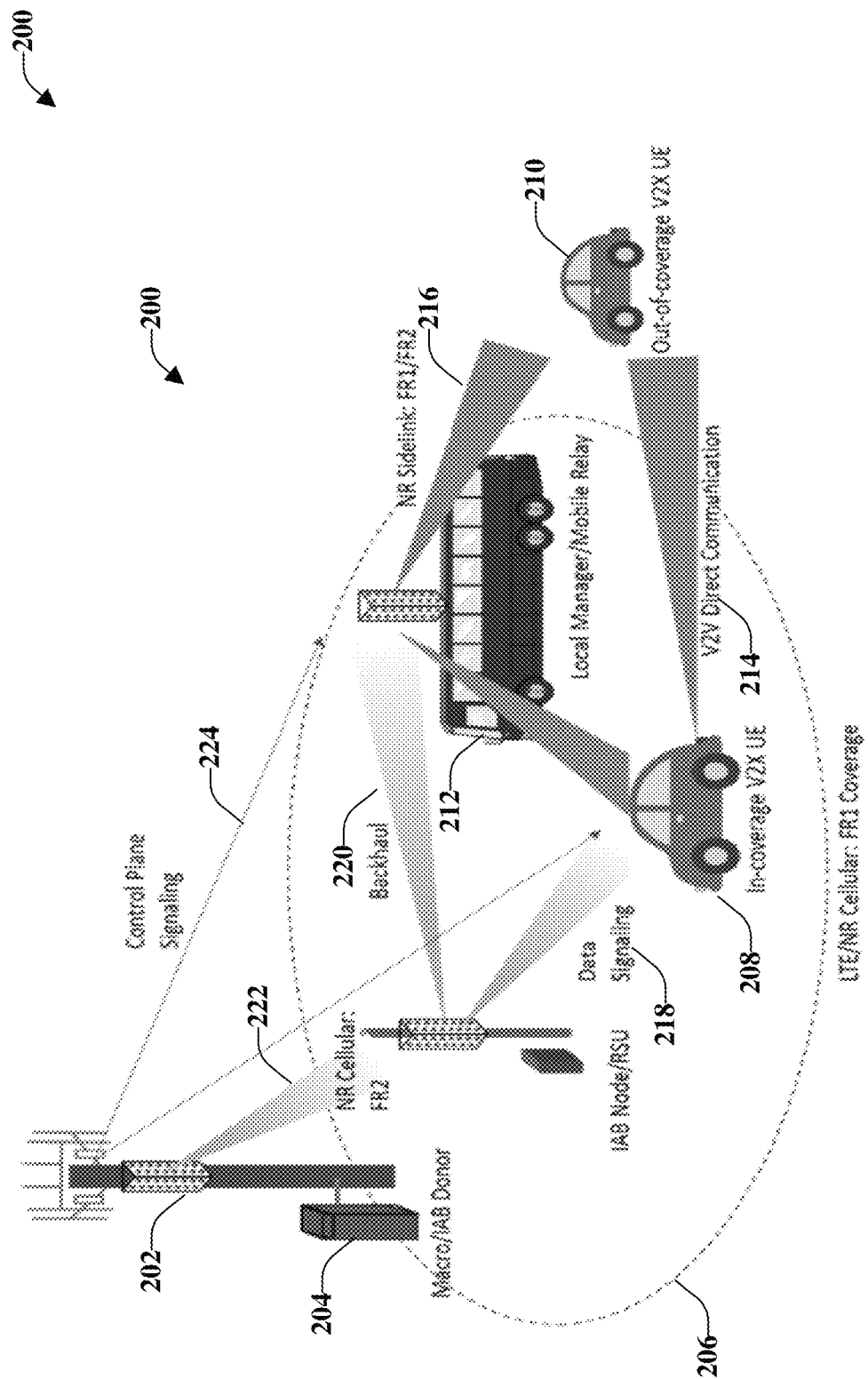
FIG. 2 illustrates an example, non-limiting, deployment of a communication network with cellular and sidelink multi-connectivity.

In the example of FIG. 2, three different communication links are used to provide control and data communication with the UE devices. A first communication link can be an LTE or NR LTE or NR cellular link on a first frequency range (FR1) carrier (e.g. sub-6 GHz). A second communication link can be a NR cellular link on a second frequency range (FR2) carrier (e.g. millimeter Wave (mmWave)). A third communication link can be a NR sidelink on either FR1 or FR2.

In addition, multiple types of communication traffic can be provided on the different links (e.g., the first link, the second link, the third link). In this example, control plane signaling (e.g. SRB) is provided on FR1, while data signaling for cellular-based traffic is provided on a FR2 carrier (e.g. DRB). The data traffic can be sent by a different node than the control plane signaling, since macro nodes can be used for providing basic coverage and mobility support, while a dense deployment of small cells/road-side access point units, can provide higher throughput access, but with smaller coverage regions.

In addition, certain UE devices and/or network node devices can be capable of acting as mobile relays based on an IAB architecture, where the mobile relay connects to an IAB node via a cellular link in order to route cellular traffic to/from one or more UEs (which may be inside or outside cellular coverage) and the core network. The backhaul traffic can be carried on FR1 or FR2, using either cellular or sidelink interfaces to the UE devices.

A third communication link type is the sidelink, which enables direct communication between UEs whether they are inside or outside network coverage. The sidelink communication can be established between two UE devices or can be facilitated by a special type of UE device/network node referred to as a local manager. The local manager can manage the discovery and link management of one or more Vehicle to Everything (V2X) UE devices which are connected/associated to the Local Manager. Additionally, the Local Manager can provide resource allocation/scheduling for direct communication between one or more UE devices or provide local breakout services by routing traffic for UE devices over the sidelink without involvement of the cellular network.

A challenge associated with traditional solutions is that local traffic can only be carried over the Uu or the sidelink without being aggregated across different types of links. In addition, relaying support is limited to the Uu and not the sidelink. The various aspects provided herein relate to how to perform multi-hop relaying, utilizing a multiple-connectivity framework, such that user traffic can be aggregated and sent on one or multiple cellular or direct communication links.

As mentioned above, the ability to utilize multiple cellular and direct communication links provides benefits in terms of reliability and throughput. Various embodiments related to achieving sidelink-based multi-connectivity (on the same or different frequency bands/carriers) and relaying are described herein and include, but are not limited to, a multi-path IP relay, a multi-path PDCP relay, and a sidelink plus Uu Dual Connectivity DC relay.

Figure 3:
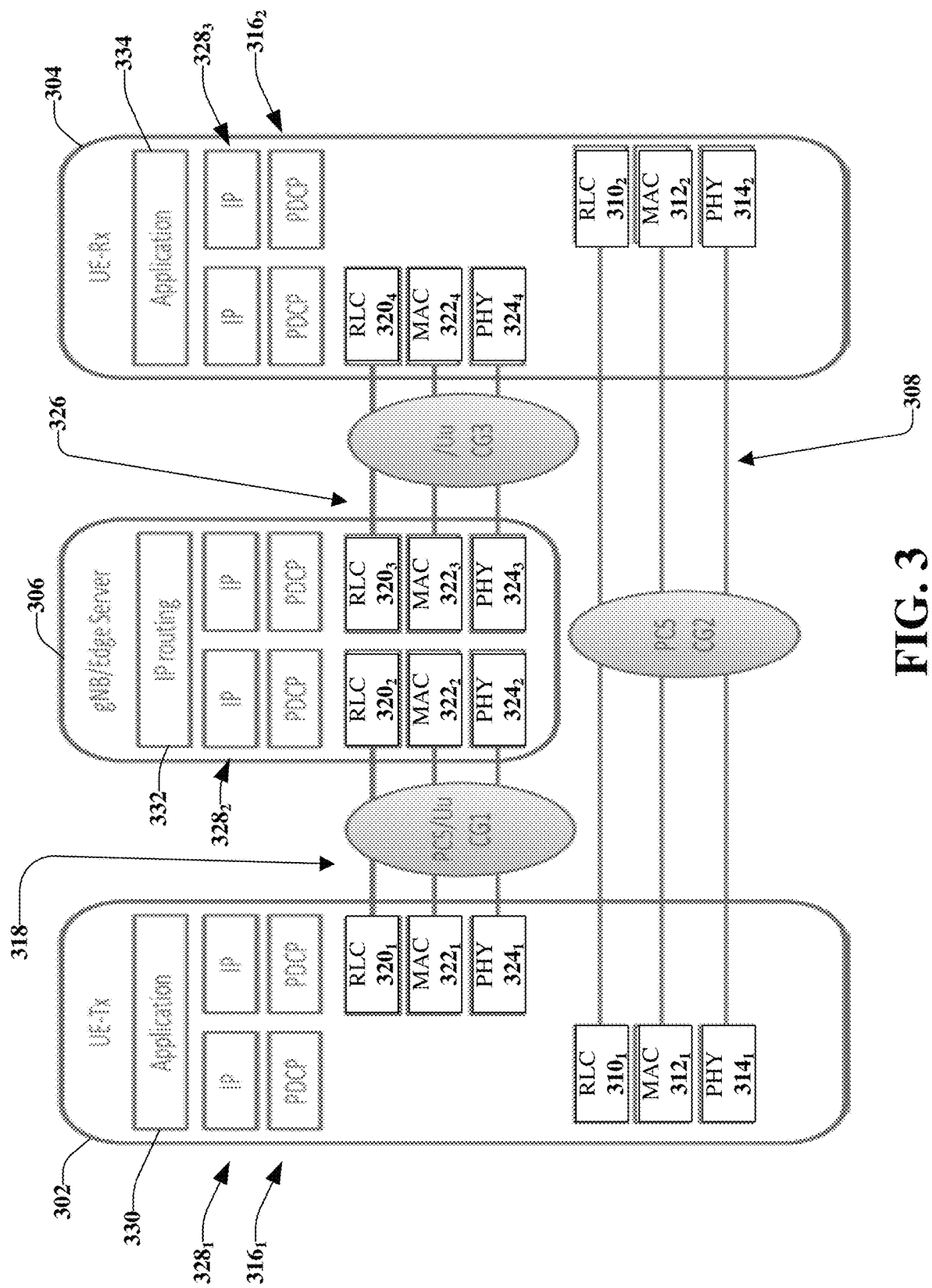
FIG. 3 illustrates an example, non-limiting, implementation of a multi-path internet protocol relay for an advanced communications network in accordance with one or more embodiments described herein.

FIG. 3 illustrates an example, non-limiting, implementation of a multi-path IP relay for an advanced communications network 300 in accordance with one or more embodiments described herein. The communications network 300 can include a transmitting UE device (a UE-Tx device 302), a receiving UE device (a UE-Rx device 304), and an intermediate relay node 306 (or intermediate relay device). It is noted that the UE-Tx device 302 can also receive communications and the UE-Rx device 304 can also transmit communications, and, therefore, their respective roles and functionalities can be reversed or interchanged.

As illustrated in FIG. 3, fully independent communication links (e.g., a first link 308) can be established between the UE-Tx device 302 and the UE-Rx device 304. In FIG. 3, the first link 308 is illustrated as three separate links, one link between respective Radio Link Control Layers (RLC layers $310_1$ and $310_2$) of the UE-Tx device 302 and the UE-Rx device 304, a second link between respective Medium Access Control Layers (MAC layers $312_1$ and $312_2$) of the UE-Tx device 302 and the UE-Rx device 304, and a third link between respective Physical Layers (PHY layers $314_1$ and $314_2$) of the UE-Tx device 302 and the UE-Rx device 304.

At least one of the independent communication links can be a direct link between the UE-Tx device 302 and the UE-Rx device 304 using a PC5 interface. The PC5 interface can be based on the sidelink protocol stack comprising respective Packet Data Convergence Protocol Layers (PDCP layers $316_1$ and $316_2$), the respective RLC layers $310_1$ and $310_2$, the respective MAC layers $312_1$ and $312_2$, and the respective PHY layers $314_1$ and $314_2$.

A second link 318 can be established (which may be on the same or different cell group) between the UE-Tx device 302 and the intermediate relay node 306. The second link 318 is illustrated as three separate links, one link between respective RLC layers $320_1$ and $320_2$ of the UE-Tx device 302 and the intermediate relay node 306, a second link between respective MAC layers $322_1$ and $322_2$ of the UE-Tx device 302 and the intermediate relay node 306, and a third link between respective PHY layers $324_1$ and $324_2$ of the UE-Tx device 302 and the intermediate relay node 306.

The second link 318 can be a relay link (e.g., relayed from the UE-Tx device 302 to the UE-Rx device 304 via the intermediate relay node 306). The intermediate relay node 306 can be a gNB, IAB-node, Local Manager, or mobile relay capable UE according to various implementations. Depending on a capability of the UE-Tx device 302 and a capability of the intermediate relay node 306, the relay link can be based on the PC5 or the Uu interface.

A third link 326, which can also be on the same or different cell group as the direct link (e.g., the independent communications links, the first link 308) and the relay links (e.g., the second link 318), can be established between the intermediate relay node 306 and the UE-Rx device 304. The third link 326 is illustrated as three separate links, one link between respective RLC layers $320_3$ and $320_4$ of the intermediate relay node 306 and the UE-Rx device 304, a second link between respective MAC layers $322_3$ and $322_4$ of the intermediate relay node 306 and the UE-Rx device 304, and a third link between respective PHY layers $324_3$ and $324_4$ of the intermediate relay node 306 and the UE-Rx device 304.

According to an implementation, the links (e.g., the first link 308, the second link 318, and the third link 326) can be fully independent up to the IP-level, illustrated as respective IP-levels $328_1$, $328_2$, and $328_3$ of the UE-Tx device 302, the intermediate relay node 306, and the UE-Rx device 304, respectively.

Since the links are fully independent up to the IP-level, both the direct route (e.g., the first link 308) and the relay routes (e.g., the second link 318 and the third link 326) can be utilized simultaneously. An application layer 330 at the UE-Tx device 302 can establish multiple IP connections between the UE-Tx device 302 and the UE-Rx device 304 and can split the data between the paths according to its desired implementation. For example, the data split can be based on Transmission Control Protocol Acknowledgement (TCP ACK) feedback, link quality measurements, Quality of Service (QoS) requirements, and so on.

For the direct link (e.g., the first link 308), the UE-Tx device 302 can process the packets received from the application layer 330 fully independently of the packets processed on the relay link (e.g., the third link 326) using its sidelink transmitter protocol stack. At the UE-Rx device 304, the packets received on the direct link (e.g., the first link 308) can be conversely processed according to the its sidelink receiver protocol stack, independently of the packets processed on its relay link with the intermediate relay node 306. The sidelink transmitter protocol stacks can be utilized for other functionality existing prior to the one or more aspects provided herein also.

For the relay link (e.g., the second link 318 and the third link 326), the intermediate relay node 306 can process the packets received from the UE-Tx device 302 according to its existing sidelink or Uu receiver stack. However, since the intermediate relay node 306 is not the destination for the IP packets, when the intermediate relay node 306 processes the IP packet, the IP address does not match its own address. Accordingly, the intermediate relay node 306 can utilize an IP routing functionality 332 to pass the packet to the intermediate relay node Tx protocol stack, where the packet is processed according to the existing sidelink or Uu stack and sent on the third link 326 between the intermediate relay node 306 and the UE-Rx device 304 (e.g., L3 relaying). At the UE-Rx device 304, the packet can be processed normally, and, in this case, the IP address of the packet matches the IP address of the UE-Rx device 304. Accordingly, the packet can be passed up to the application layer 334 where the packet can be aggregated with data from the direct link (e.g., the first link 308).

Figure 4:
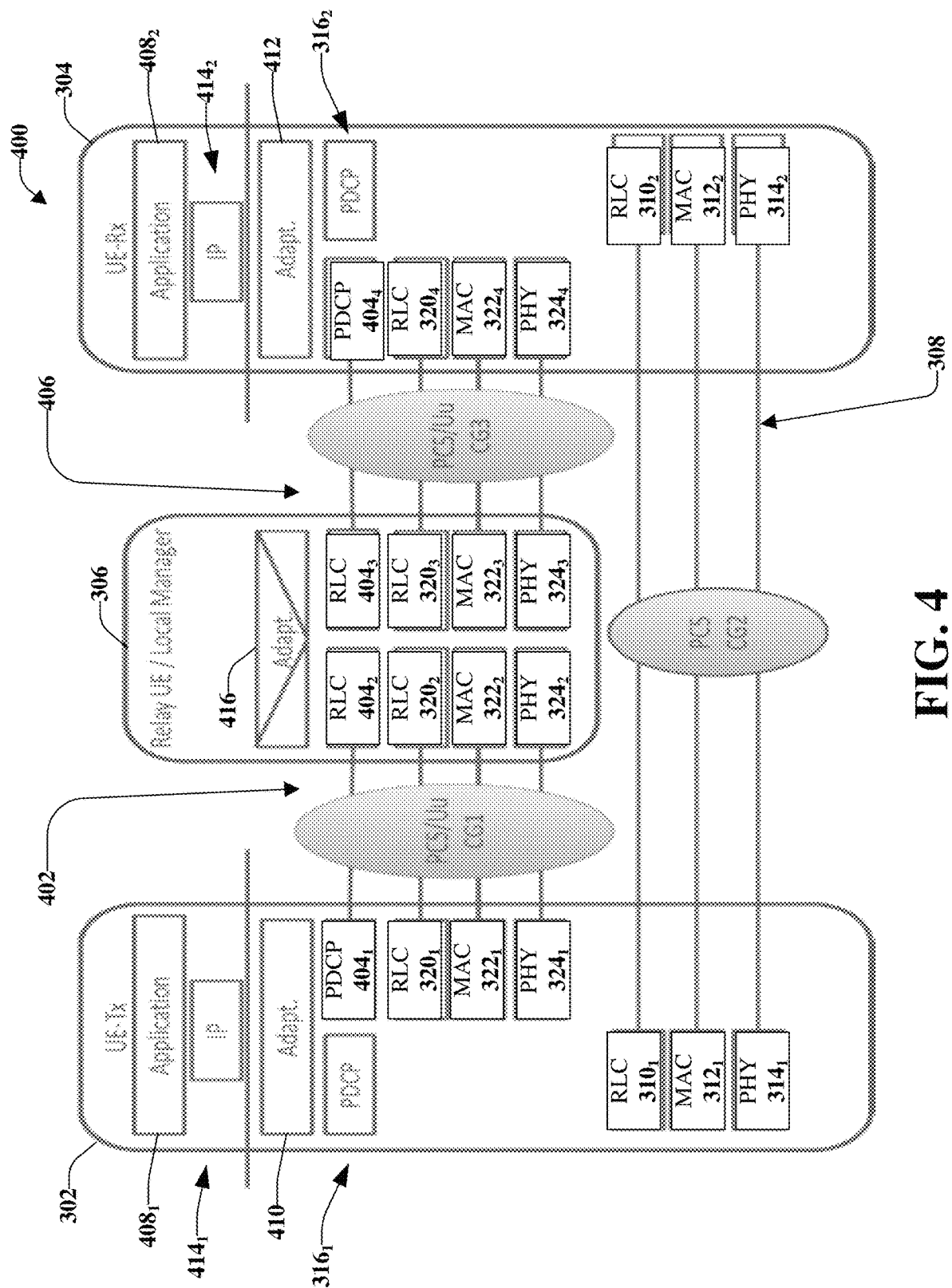
FIG. 4 illustrates an example, non-limiting implementation of a multi-path packet data convergence protocol relay for an advanced communications network in accordance with one or more embodiments described herein.

FIG. 4 illustrates an example, non-limiting implementation of a multi-path packet data convergence protocol relay for an advanced communications network in accordance with one or more embodiments described herein. Repetitive description of like elements employed in other embodiments described herein is omitted for sake of brevity.

As illustrated in FIG. 4, fully independent communication links (e.g., a first link 308) can be established between the transmitting UE device (UE-Tx device 302) and the receiving UE device (UE-Rx device 304). At least one of the independent communication links can be a direct link between the UE-Tx device 302 and the UE-Rx device 304 using the PC5 interface based on the sidelink protocol stack comprising the respective PDCP layers, the respective RLC layers $310_1$ and $310_2$, the respective MAC layers $312_1$ and $312_2$, and the respective PHY layers $314_1$ and $314_2$.

A second link 402 can be established (which may be on the same or different cell group) between the UE-Tx device 302 and the intermediate relay node 306, which may be a gNB, IAB-node, Local Manager, or mobile relay capable UE device. Depending on the UE-Tx device 302 and intermediate relay node 306 capabilities, the relay link (e.g., the second link 318) can be based on the PC5 or Uu interface.

As illustrated the second link 402 has four separate links. A first link is between respective RLC layers $320_1$ and $320_2$ of the UE-Tx device 302 and the intermediate relay node 306. A second link is between respective MAC layers $322_1$ and $322_2$ of the UE-Tx device 302 and the intermediate relay node 306. A third link is between respective PHY layers $324_1$ and $324_2$ of the UE-Tx device 302 and the intermediate relay node 306. Further, a fourth link is between respective PDCP layers $404_1$ and $404_2$ of the UE-Tx device 302 and the intermediate relay node 306.

A third link 406, which can also be on the same or different cell group as the direct and relay links (e.g., the first link 308, the second link 402), can be established between the intermediate relay node 306 and the UE-Rx device 304. The third link 406 is illustrated as four separate links. A first link is between respective RLC layers $320_3$ and $320_4$ of the intermediate relay node 306 and the UE-Rx device 304. A second link is between respective MAC layers $322_3$ and $322_4$ of the intermediate relay node 306 and the UE-Rx device 304. A third link is between respective PHY layers $324_3$ and $324_4$ of the intermediate relay node 306 and the UE-Rx device 304. Further, a fourth link is between respective PDCP layers $404_3$ and $404_4$ of the intermediate relay node 306 and the UE-Rx device 304.

In the implementation of FIG. 4, the links (e.g., the first link 308, the second link 402, and the third link 406) can be fully independent up to the PDCP-level, with a common application layer $408_1$ and $408_2$ with a single IP address. To utilize both the direct route (e.g., the first link 308) and the relay routes (e.g., the second link 402 and the third link 406) simultaneously, the UE-Tx device 302 can establish multiple independent and parallel links at the PDCP-level between the UE-Tx device 302 and the UE-Rx device 304 (including independent bearers). Further, the UE-Tx device 302 can split the data between the paths according to its desired implementation. For example, the data split can be based on L2/L3 feedback, link quality measurements, QoS requirements, and so on.

For the direct link (e.g., the first link 308), before the UE-Tx device 302 sends the packets received from the application layer $408_1$ to the existing sidelink transmitter protocol stack, the UE-Tx device 302 can process the packets using an Adapt layer 410 (or adaptation layer) which can be inserted above the PDCP layer (e.g. L3 relaying). At the UE-Rx device 304, the packets received on the direct link (e.g., the first link 308) can be conversely processed according to the existing sidelink receiver protocol stack, independently of the packets processed on its relay link (e.g., the third link 406) with the intermediate relay node 306. After processing by a PDCP layer at the UE-Rx device 304, the packet is passed to an Adapt Layer 412 where, since the UE-Rx device 304 matches the destination ID, the packet is passed through to the IP layer $414_1$/Application Layer $408_1$ without additional processing or is processed via Adapt header removal.

For the relay link (e.g., the second link 402, the third link 406), the intermediate relay node 306 processes the packets received from the UE-Tx device 302 according to the existing sidelink or Uu receiver stack. However, since the intermediate relay node 306 is not the destination for the PDCP packets, when the intermediate relay node 306 processes the PDCP packet, it passes the packet to an Adapt layer 416. Since the Adapt address (e.g. destination ID) does not match its own address, the intermediate relay node 306 utilizes Adapt layer routing functionality to pass the packet to the intermediate node Tx protocol stack, where the packet is processed according to the existing sidelink or Uu stack. After being received on the third link 406 between the intermediate relay node 306 and the UE-Rx device 304, the packet is processed normally. Further, since the Adapt destination ID of the packet matches the address of the UE-Rx device 304, the packet is passed up to the IP layer $414_2$/application layer $408_2$ where the packet can be aggregated with data from the direct link (e.g., the first link 308).

Figure 5:
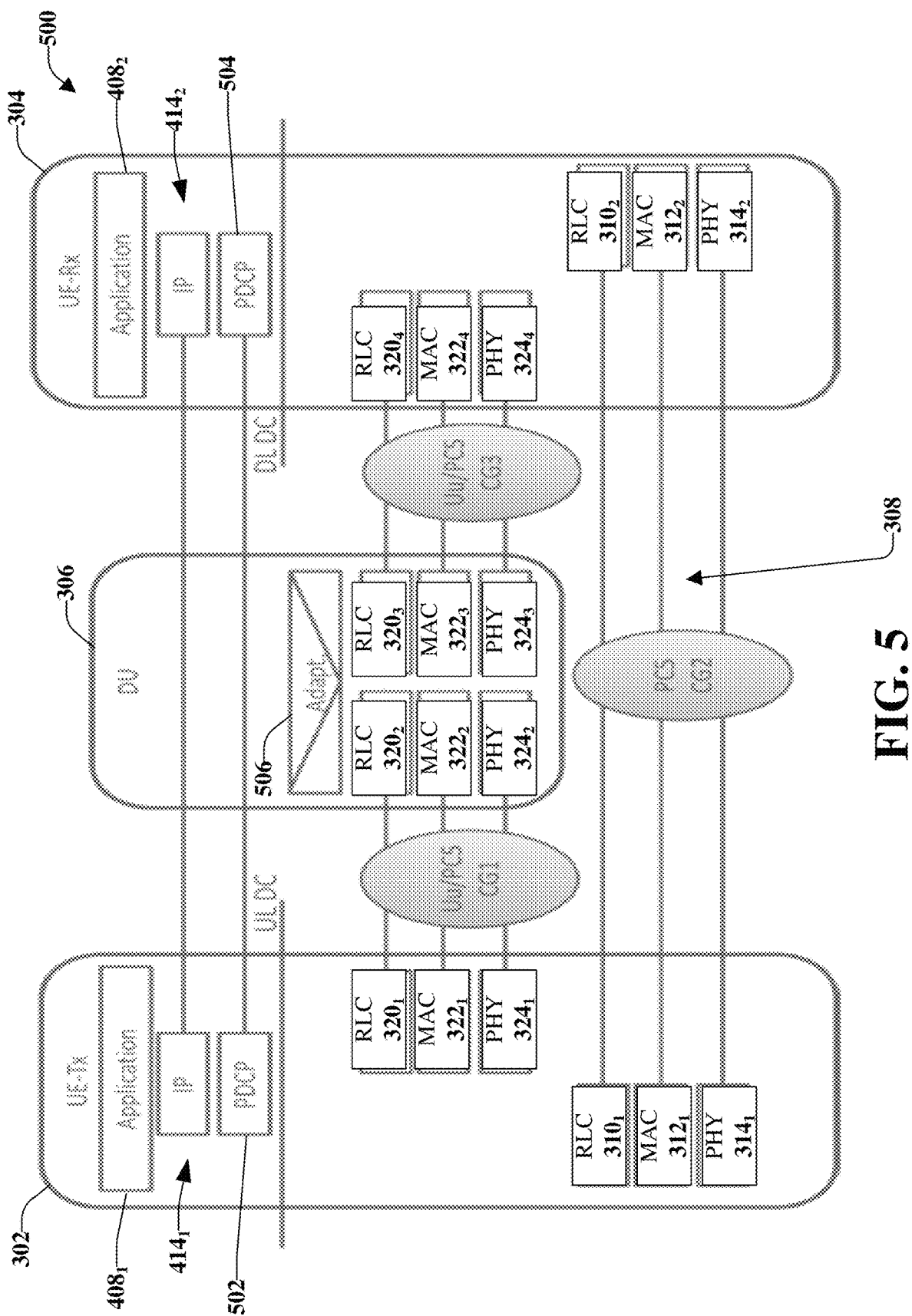
FIG. 5 illustrates an example, non-limiting implementation of sidelink plus cellular interface dual connectivity relay for an advanced communications network in accordance with one or more embodiments described herein.

FIG. 5 illustrates an example, non-limiting implementation of sidelink plus cellular (Uu) interface dual connectivity (DC) Relay for an advanced communications network 500 in accordance with one or more embodiments described herein. Repetitive description of like elements employed in other embodiments described herein is omitted for sake of brevity.

According to the implementation of FIG. 5, multi-connectivity is used to establish links between the UE-Tx device 302 and the UE-Rx device 304. One of the links can be a direct link (e.g., the first link 308) between the UE-Tx device 302 and the UE-Rx device 304 using the PC5 interface based on the sidelink protocol stack comprising respective PDCP layers, the respective RLC layers $310_1$ and $310_2$, the respective MAC layers $312_1$ and $312_2$, and the respective PHY layers $314_1$ and $314_2$.

A second link can be established (which may be on the same or different cell group) between the UE-Tx device 302 and the intermediate relay node 306, which may be a gNB, IAB-node, Local Manager, or mobile relay capable UE device. Depending on the UE-Tx device 302 and intermediate relay node 306 capability, the relay link can be based on the PC5 or Uu interface. A third link can be established between the intermediate relay node 306 and the UE-Rx device 304.

From the perspective of the UE-Tx device 302, the multi-connectivity established is an uplink or upstream connectivity with a single PDCP 502 splitting data across multiple legs, and either the direct link (e.g., the first link 308) or the relay link can correspond to a Master Cell Group (MCG) with the other link corresponding to the Secondary Cell Group (SCG) in case Dual Connectivity (DC) procedures are reused to establish and maintain the links.

From the perspective of the UE-Rx device 304, the multi-connectivity established is a downlink or downstream connectivity with a single PDCP 504 receiving data across multiple legs, and either the direct link (e.g., the first link 308) or the relay link can correspond to the Master Cell Group (MCG) with the other link corresponding to the Secondary Cell Group (SCG) in case Dual Connectivity (DC) procedures are reused to establish and maintain the links.

Advantages of this implementation is that since the links are aggregated end-to-end under a single PDCP at the UE-Tx device 302 and the UE-Rx device 304, dual connectivity procedures can apply for managing the traffic split across the MCG and SCG links. For example, the traffic flow across the links can be based on a split or switched bearer, and MCG/SCG link measurement/management (e.g., Radio Resource Management (RRM), Radio Link Failure (RLF)) procedures can be reused.

For the relay link, the intermediate relay node 306 processes the packets received from the UE-Tx device 302 according to the existing sidelink or Uu receiver stack up to the RLC Layer. However, since the intermediate relay node 306 is not the destination for the packets, the intermediate relay node 306 cannot pass the packets to a PDCP layer. Instead the intermediate relay node 306 processes the RLC packets, with an Adapt Layer 506 (e.g. L2 relaying), which has at least routing functionality to pass the packet to the intermediate node Tx protocol stack RLC channel, where the packet is processed according to the existing sidelink or Uu stack. At the UE-Rx device 304, the packet is processed normally, and since the packet is transported on the end-to-end bearer established between the UE-Tx device 302 and the UE-Rx device 304 at the PDCP layer, the packet is passed up to the PDCP layer where the packet can be aggregated with data from the direct link (e.g., the first link).

In order for the Adapt Layer internal routing of RLC packets between the receiver (e.g., the UE-Rx device 304) and the transmitter (e.g., UE-Tx device 302), the transmitter RLC channels can be one-to-one (1:1) mapped to the bearers of the UE-Rx device 304. This is because if the intermediate relay node 306 has traffic destined for the UE-Rx device 304 in addition to traffic which originated from the UE-Tx(s) UEs, the different traffic cannot be sent on the same RLC channel (although multiplexed on the same physical communication link), but need to be sent on dedicated RLC channels, so that the UE-Rx device 304 can pass them to the corresponding PDCP entity in a transparent manner.

Discussed herein are aspects that can facilitate enablement of enhanced sidelink services in advanced networks. As discussed, multi-hop L2 or L3 relaying can be performed utilizing a multiple-connectivity framework such that user traffic can be aggregated and sent on one or multiple cellular or direct communication links.

Benefits of the disclosed aspects include, but are not limited to, increased robustness via multi-connectivity compared to single connectivity links between UE devices, especially over mmWave frequencies which are subject to frequent blockage events in mobility scenarios. Another benefit is coverage extension and capacity improvements via relaying over sidelink or cellular links. Yet another benefit is a common framework for aggregating sidelink and cellular links using network infrastructure or mobile UEs/relays. Efficiency improvements and support for network control can also be realized by enhancing dual connectivity and L2-relaying procedures compared to utilizing application layer aggregation with independent links.

According to some implementations, load balancing of user traffic can be facilitated with the disclosed aspects. For example, the user traffic can be balanced between the direct link and the relay links.

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
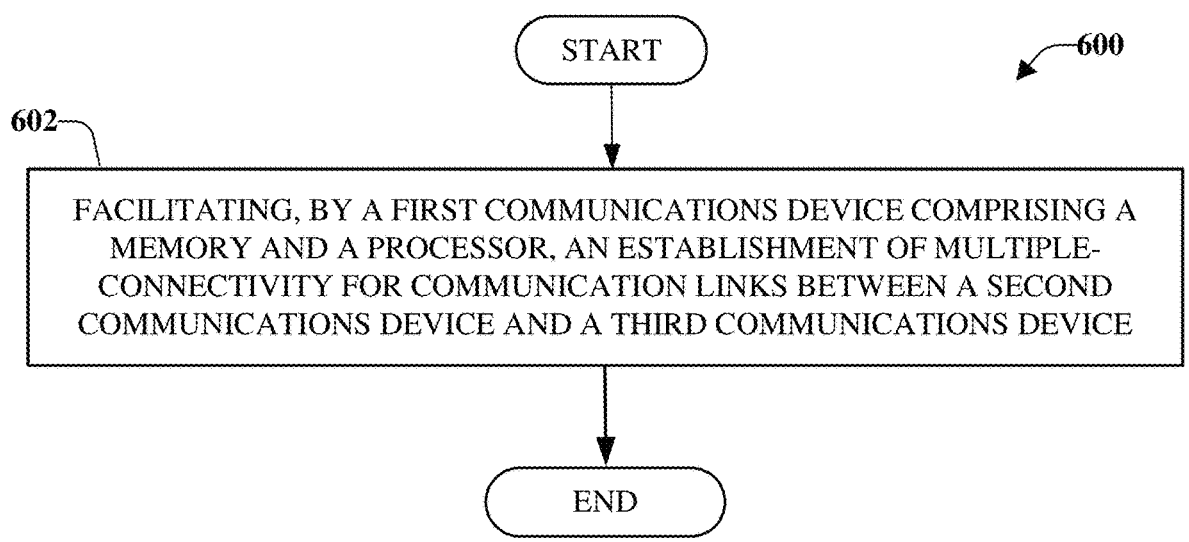
FIG. 6 illustrates a flow diagram of an example, non-limiting, computer-implemented method for facilitating enhanced sidelink services in advanced networks in accordance with one or more embodiments described herein.

FIG. 6 illustrates a flow diagram of an example, non-limiting, computer-implemented method 600 for facilitating enhanced sidelink services in advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a machine readable or computer readable storage device comprising executable instructions that, in response to execution, cause a system comprising a processor to perform operations, which can be operations discussed with respect to the computer-implemented method 600 and/or other methods discussed herein. In yet another example, an intermediate relay node device can be configured to perform operations, which can be operations discussed with respect to the computer-implemented method 600 and/or other methods discussed herein.

The computer-implemented method 600 comprises facilitating, by a first communications device comprising a memory and a processor, an establishment of multiple-connectivity for communication links between a second communications device and a third communications device, at 602. The first communications device can be the intermediate relay node 306. The second communications device can be the UE-Tx device 302. Further, the third communications device can be the UE-Rx device 304. The multiple-connectivity can include one or more direct links (e.g., the first link 308) and one or more relay links (e.g., the second link 318, the second link 402, the third link 326, the third link 406, and so on). According to some implementations, establishment of the multiple-connectivity for the communication links can comprise implementing a layer 2 relay functionality.

According to some implementations, to facilitate the establishment of the multiple-connectivity for the communication links, the first communications device can facilitate establishing a communication link between the second communications device and the third communications device. The communication link can be the direct link (e.g., the first link 308). In an example, establishing the communication link comprises establishing a direct link between the second communications device and the third communications device. The direct link can be established via a sidelink interface according to some implementations.

Further to these implementations, the first communications device can facilitate establishing a first communication relay link between the second communications device and the first communications device and a second communication relay link between the first communications device and the third communications device. This can comprise establishing the first communication relay link and the second communication relay link via a cellular interface. Alternatively, or additionally, this can comprise establishing the first communication relay link and the second communication relay link via a sidelink interface.

Figure 7:
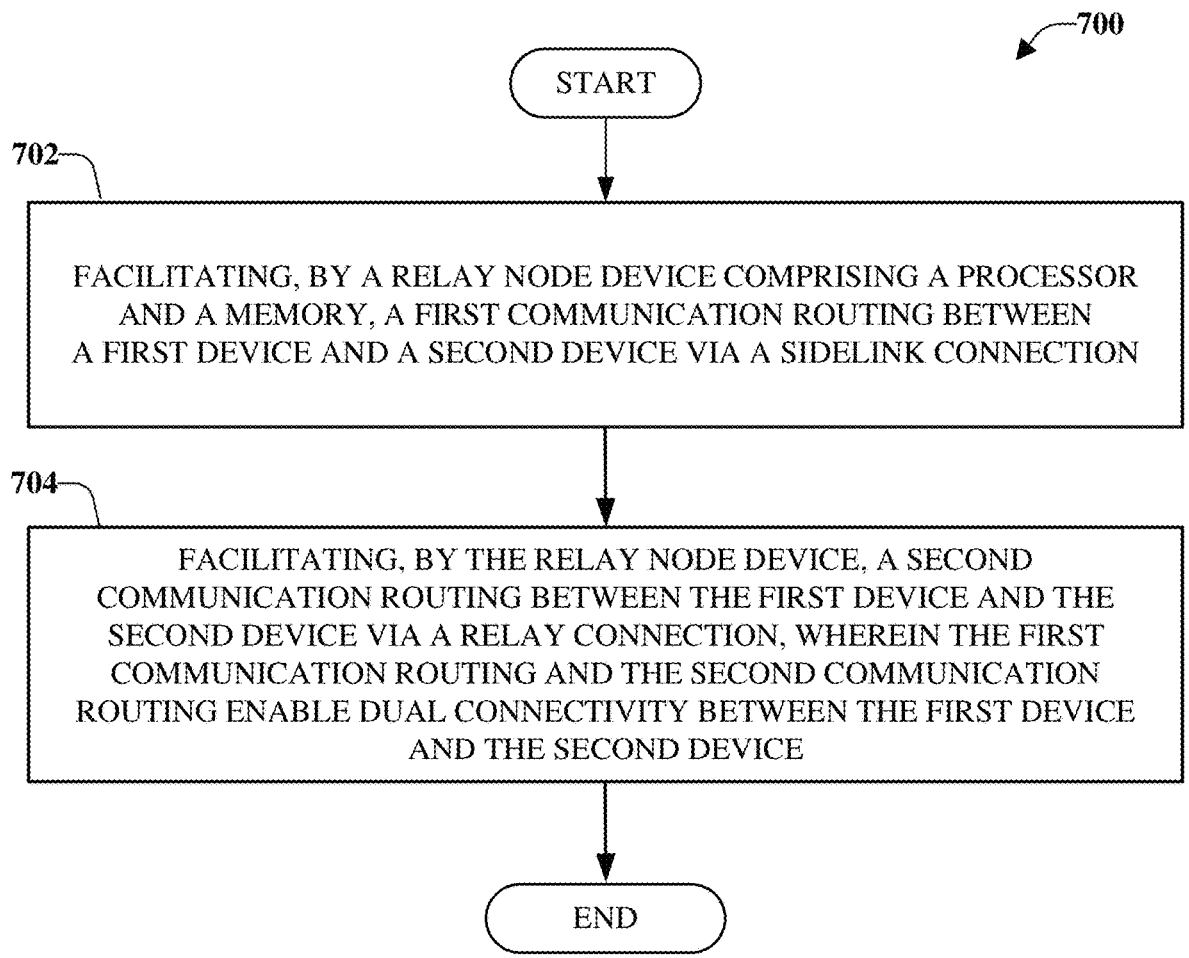
FIG. 7 illustrates a flow diagram of an example, non-limiting, computer-implemented method for facilitating dual connectivity between devices in advanced networks in accordance with one or more embodiments described herein.

FIG. 7 illustrates a flow diagram of an example, non-limiting, computer-implemented method 700 for facilitating dual connectivity between devices in advanced networks in accordance with one or more embodiments described herein. Repetitive description of like elements employed in other embodiments described herein is omitted for sake of brevity.

The computer-implemented method 700 starts at 702 when a relay node device (e.g., the intermediate relay node 306) comprising a memory and a processor can facilitate a first communication routing between a first device (e.g., the UE-Tx device 302) and a second device (e.g., the UE-Rx device 304) via a sidelink connection. To facilitate the first communication routing, the relay node device can implement a direct link (e.g., the first link 308) between the first device and the second device. The direct link can be implemented via a sidelink interface, according to some implementations.

Further, at 704 of the computer-implemented method 700, the relay node device can facilitate a second communication routing between the first device and the second device via a relay connection. The relay connection can be implemented via a cellular interface, a sidelink interface, or both the cellular interface and the sidelink interface.

The first communication routing and the second communication routing can enable dual connectivity between the first device and the second device. To facilitate the second communication routing, the relay node device can implement a relay functionality to relay wireless communication between the first device and the second device. To implement the relay functionality, a layer 2 functionality can be implemented.

Figure 8:
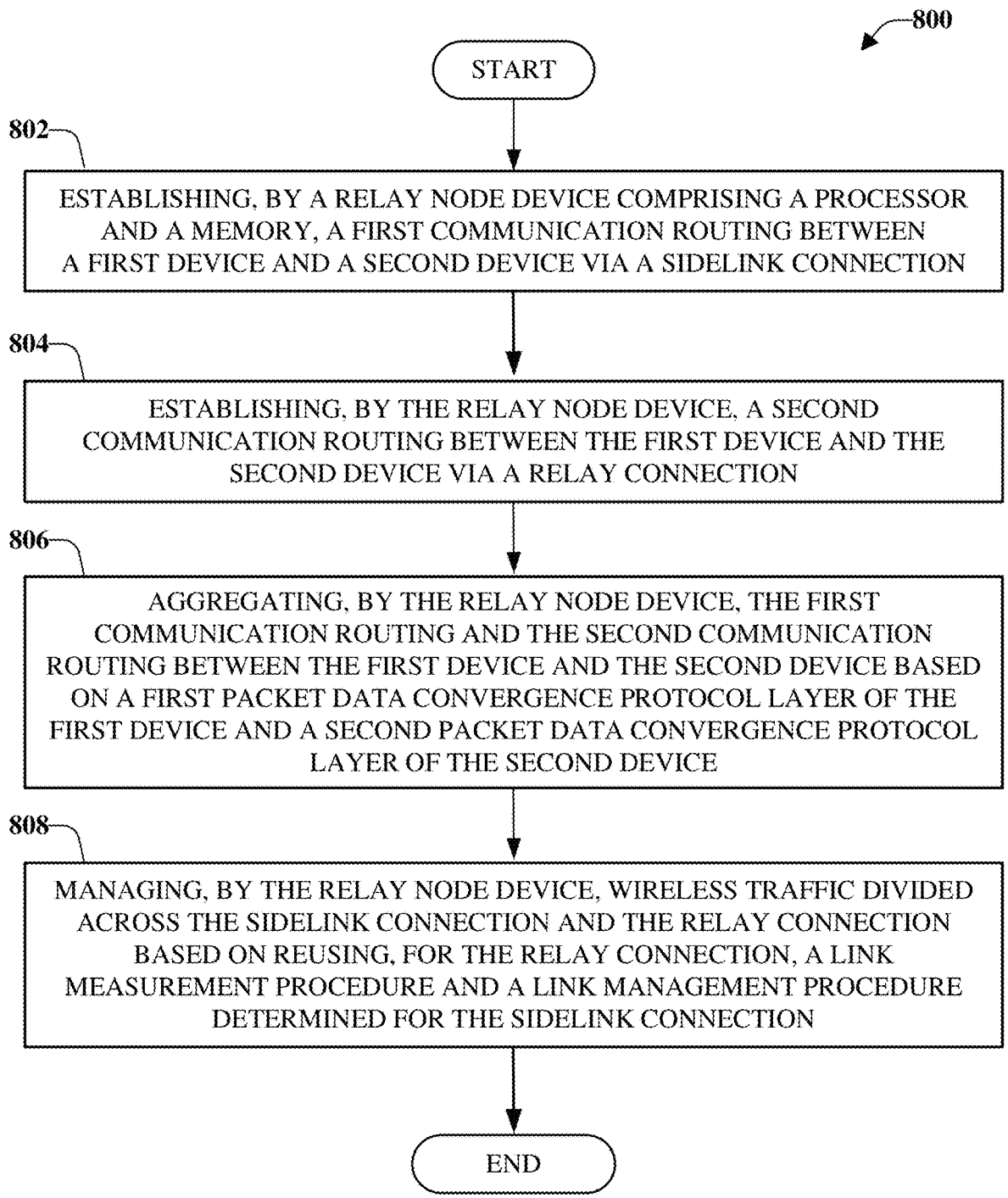
FIG. 8 illustrates a flow diagram of an example, non-limiting, computer-implemented method for facilitating aggregation of user traffic and sending the user traffic on one or multiple cellular or direct communication links in advanced networks in accordance with one or more embodiments described herein.

FIG. 8 illustrates a flow diagram of an example, non-limiting, computer-implemented method 800 for facilitating aggregation of user traffic and sending the user traffic on one or multiple cellular or direct communication links in advanced networks in accordance with one or more embodiments described herein. Repetitive description of like elements employed in other embodiments described herein is omitted for sake of brevity.

The computer-implemented method 800 starts at 802 when a first communication routing between a first device (e.g., the UE-Tx device 302) and a second device (e.g., the UE-Rx device 304) via a sidelink connection (e.g., the first link 308) can be established. Further, at 804, a second communication routing between the first device and the second device via a relay connection (e.g., the second link 318, the second link 402, the third link 326, the third link 406, and so on) can be established.

At 806 of the computer-implemented method 800, the first communication routing and the second communication routing between the first device and the second device can be aggregated. For example, the aggregation can be based on a first packet data convergence protocol layer of the first device and a second packet data convergence protocol layer of the second device.

Further, at 808, wireless traffic divided across the sidelink connection and the relay connection can be managed based on reusing, for the relay connection, a link measurement procedure and a link management procedure determined for the sidelink connection. Alternatively, a link measurement procedure and a link management procedure determined for the relay connection can be reused for the sidelink connection.

Described herein are systems, methods, articles of manufacture, and other embodiments or implementations that can facilitate sidelink-based relaying and multi-connectivity in advanced networks. Facilitating sidelink-based relaying and multi-connectivity in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
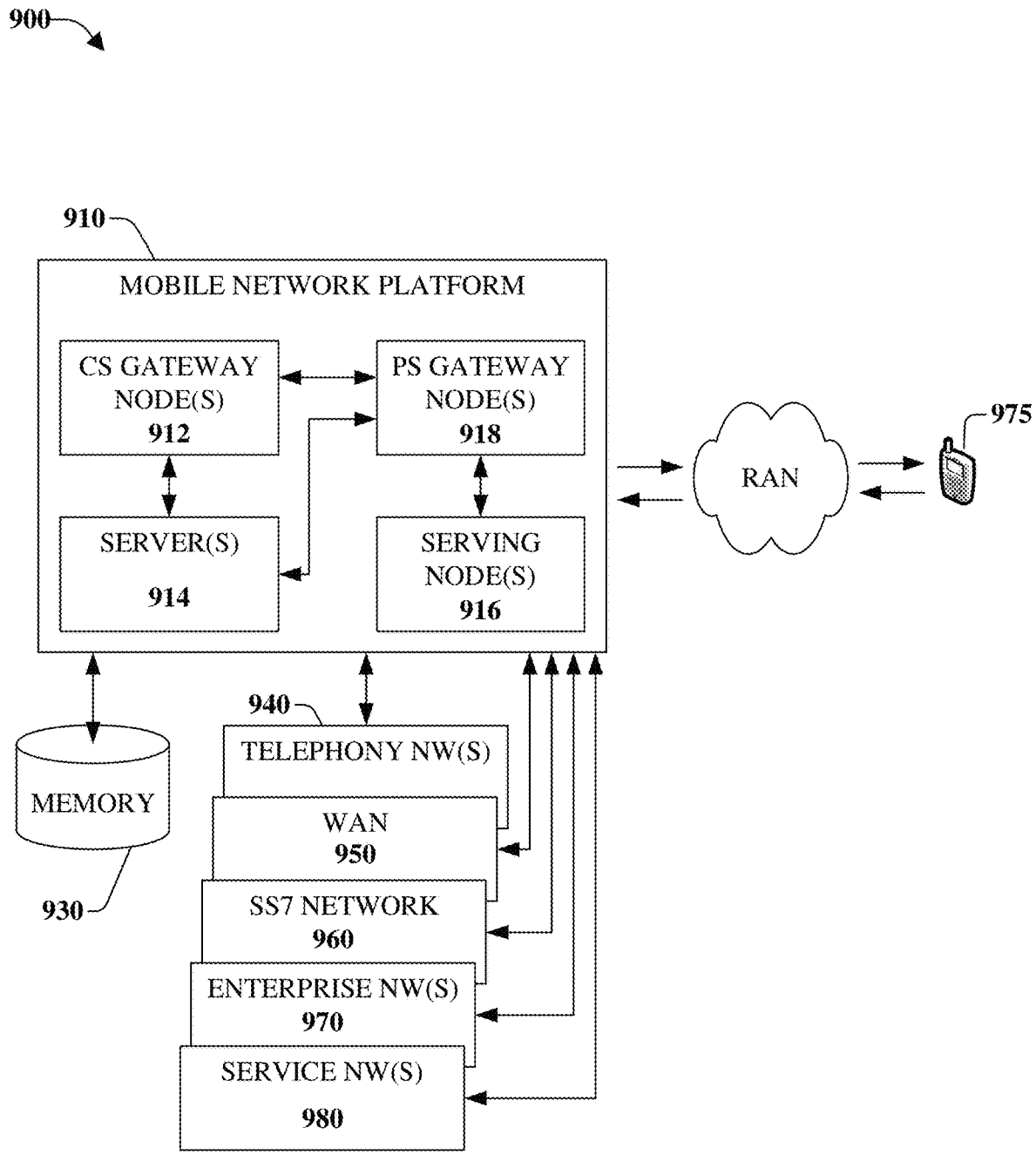
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
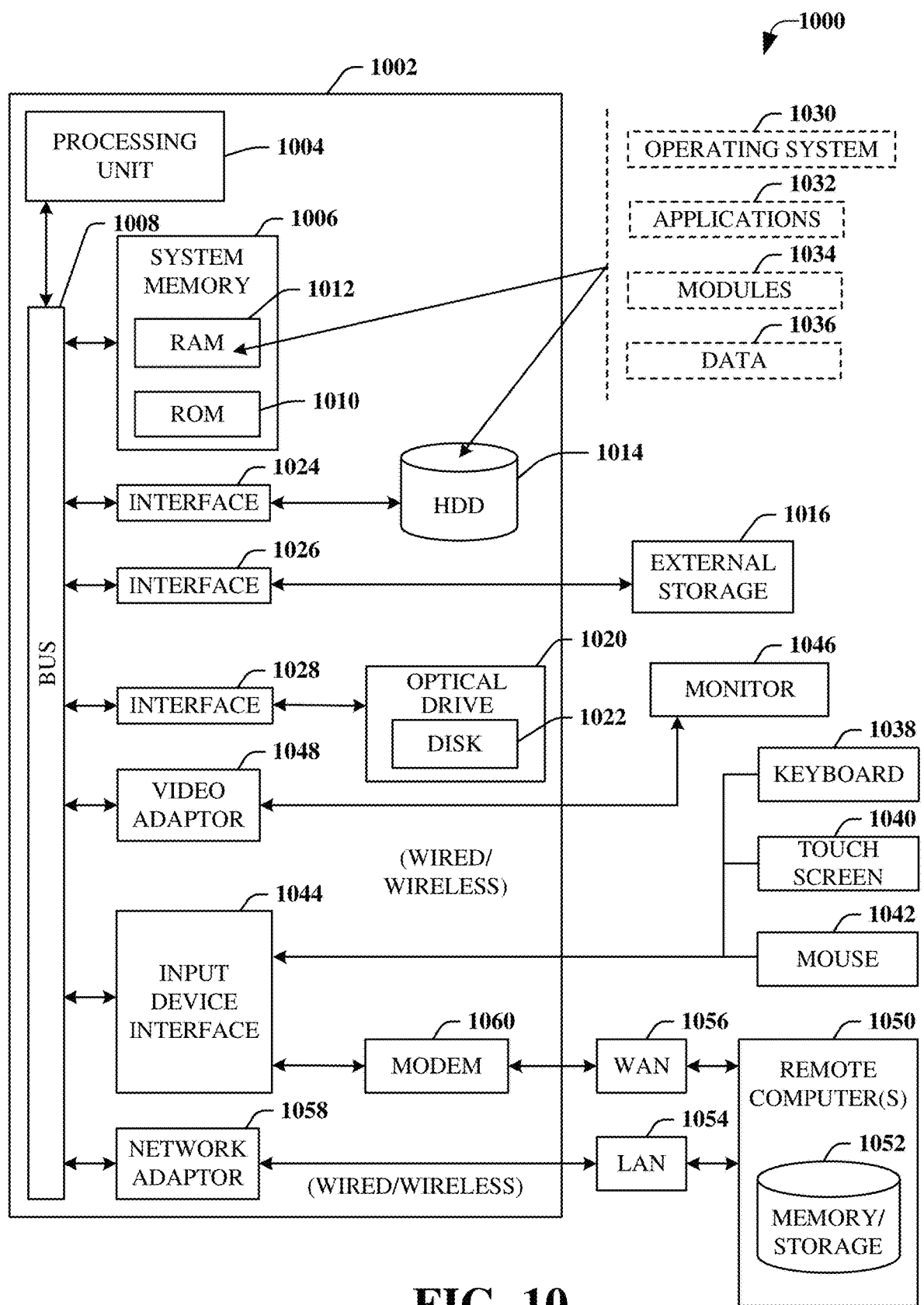
FIG. 10 illustrates an example block diagram of an example computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an internal HDD 1014. The internal HDD 1014, external storage device(s) 1016 and optical disk drive 1020 can be connected to the system bus 1008 by an HDD interface 1024, an external storage interface 1026 and an optical drive interface 1028, respectively. The HDD interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a processor; and
    a memory that stores executable instructions that, when executed by the processor, facilitate performance of operations, comprising:
        facilitating a first communication routing between a first device and a second device via a sidelink connection;
        facilitating a second communication routing between the first device and the second device via a relay connection, wherein the first communication routing and the second communication routing enable dual connectivity between the first device and the second device;
        aggregating the first communication routing and the second communication routing between the first device and the second device based on a first packet data convergence protocol layer of the first device and a second packet data convergence protocol layer of the second device; and
        managing wireless traffic divided across the sidelink connection and the relay connection based on reusing, for the relay connection, a link measurement procedure and a link management procedure determined for the sidelink connection.

2. The system of claim 1, wherein the facilitating the second communication routing comprises implementing a relay functionality to relay wireless communication between the first device and the second device.

3. The system of claim 2, wherein the implementing the relay functionality comprises implementing a layer 2 functionality.

4. The system of claim 1, wherein the facilitating the first communication routing comprises implementing a direct link between the first device and the second device.

5. The system of claim 4, wherein the direct link is implemented via a sidelink interface.

6. The system of claim 1, wherein the facilitating the first communication routing and the facilitating the second communication routing comprises facilitating establishing the dual connectivity for the first device and the second device.

7. The system of claim 1, wherein the relay connection is implemented via a cellular interface.

8. The system of claim 1, wherein the relay connection is implemented via a sidelink interface.

9. The system of claim 1, wherein the first device and the second device are configured to operate configured to operate according to at least a fifth generation network communication protocol.

10. A method, comprising:
    facilitating, by a first communications device comprising a memory and a processor, an establishment of multiple-connectivity for communication links between a second communications device and a third communications device, wherein the facilitating the establishment of the multiple-connectivity for the communication links comprises:
        facilitating establishing a communication link between the second communications device and the third communications device;
        facilitating establishing a first communication relay link between the second communications device and the first communications device and a second communication relay link between the first communications device and the third communications device;
        aggregating the communication link and the first communication relay link based on a first packet data convergence protocol layer of the second communications device and a second packet data convergence protocol layer of the third communications device; and
        managing network traffic divided across the communication link and the first communication relay link based on reusing, for the first communication relay link, a link measurement procedure and a link management procedure determined for the first communication relay link.

11. The method of claim 10, wherein the establishing the communication link comprises establishing a direct link between the second communications device and the third communications device.

12. The method of claim 11, wherein the establishing the direct link comprises establishing the direct link via a sidelink interface.

13. The method of claim 10, wherein the establishing the first communication relay link and the establishing the second communication relay link comprises establishing the first communication relay link and the second communication relay link via a cellular interface.

14. The method of claim 10, wherein the establishing the first communication relay link and the establishing the second communication relay link comprises establishing the first communication relay link and the second communication relay link via a sidelink interface.

15. The method of claim 10, wherein the facilitating the establishment of the multiple-connectivity for the communication links comprises implementing a layer 2 relay functionality.

16. A non-transitory machine-readable medium, comprising executable instructions that, when executed by a processor, facilitate performance of operations, comprising:
    establishing a direct link for first user traffic routed between a first device and a second device via a sidelink interface;
    establishing a relay link for second user traffic routed between the first device and the second device via a cellular interface or the sidelink interface;
    aggregating the direct link and the relay link based on a first packet data convergence protocol layer of the first device and a second packet data convergence protocol layer of the second device; and managing user traffic divided across the direct link and the relay link based on reusing a link measurement procedure and a link management procedure for the direct link and the relay link.

17. The non-transitory machine-readable medium of claim 16, wherein the establishing the relay link comprises implementing a layer 2 relay functionality.

18. The non-transitory machine-readable medium of claim 16, wherein the operations further comprise:
routing the first user traffic via the direct link; and
routing the second user traffic via the relay link at a same time as the routing the first user traffic via the direct link.

19. The non-transitory machine-readable medium of claim 16, wherein the establishing the relay link comprises implementing a relay functionality to relay wireless communication between the first device and the second device.

20. The non-transitory machine-readable medium of claim 16, wherein the establishing of the direct link and the establishing of the relay link comprises facilitating establishing dual connectivity for the first device and the second device.

* * * * *